(12) United States Patent
Dubois

(10) Patent No.: US 9,097,573 B2
(45) Date of Patent: Aug. 4, 2015

(54) ON-BOARD DEVICE FOR MEASURING THE WEIGHT OF AN AIRCRAFT AND THE POSITION OF ITS CENTER OF GRAVITY

(71) Applicant: AIRBUS HELICOPTERS, Marignane, Cedex (FR)

(72) Inventor: Robert Dubois, Aix en Provence (FR)

(73) Assignee: Airbus Helicopters, Marignane Cedex (FR)

( * ) Notice: Subject to any disclaimer, the term of this patent is extended or adjusted under 35 U.S.C. 154(b) by 257 days.

(21) Appl. No.: 13/746,392

(22) Filed: Jan. 22, 2013

(65) Prior Publication Data

US 2013/0192903 A1 Aug. 1, 2013

(30) Foreign Application Priority Data

Jan. 30, 2012 (FR) ...................................... 12 00265

(51) Int. Cl.
*G01G 19/07* (2006.01)
*G01G 7/02* (2006.01)

(52) U.S. Cl.
CPC . *G01G 19/07* (2013.01); *G01G 7/02* (2013.01)

(58) Field of Classification Search
CPC .................................. G01G 19/07; G01G 7/02
See application file for complete search history.

(56) References Cited

U.S. PATENT DOCUMENTS

| 3,426,586 | A | | 2/1969 | Kadlec |
| 3,488,997 | A | | 1/1970 | Kliever |
| 4,083,236 | A | * | 4/1978 | Steinmueller ............... 73/862.52 |
| 4,098,364 | A | * | 7/1978 | Schedrovitsky et al. ....................... 177/210 EM |
| 4,312,042 | A | | 1/1982 | Bateman |
| 4,405,025 | A | * | 9/1983 | Yanagita et al. ........ 177/210 FP |
| 4,503,922 | A | | 3/1985 | Brosh |
| 5,172,781 | A | | 12/1992 | Hlavinka |
| 5,205,514 | A | | 4/1993 | Patzig |
| 2006/0283239 | A1 | | 12/2006 | Leroy |

FOREIGN PATENT DOCUMENTS

| EP | 0482289 A2 | 4/1992 | |
| FR | 2564582 A1 | 11/1985 | |
| FR | 2 875 598 A1 * | 3/2006 | ............. G01G 19/07 |
| FR | 2875598 A1 | 3/2006 | |
| WO | 2004074787 A1 | 9/2004 | |

OTHER PUBLICATIONS

Machine translation of the detailed description section of FR 2 564 582 (A1), Mar. 9, 2015.*
Machine translation of the detailed description section of FR 2 875 598 (A1), Mar. 9, 2015.*
Search Report and Written Opinion; Application No. FR 1200265; dated Sep. 5, 2012.

* cited by examiner

*Primary Examiner* — Randy W Gibson
(74) *Attorney, Agent, or Firm* — Brooks Kushman P.C.

(57) ABSTRACT

An on-board device (5) for measuring the weight of an aircraft (G), the device comprising a hollow element (3) extending from a first end (11) to a second end (12) and a bar (4) extending inside said hollow element (3) from an embedded end (13) to a free end (14). The free end (14) has first and second sensors (21, 22) respectively for taking first and second distance measurements, said device (5) further including processor means (50) connected to the first sensor (21) and to the second sensor (22) to generate an alert when a sum of the first measurement plus the second measurement varies, and secondly a processor unit (60) connected to at least one of said sensors (21, 22) for determining information relating to weight.

10 Claims, 2 Drawing Sheets

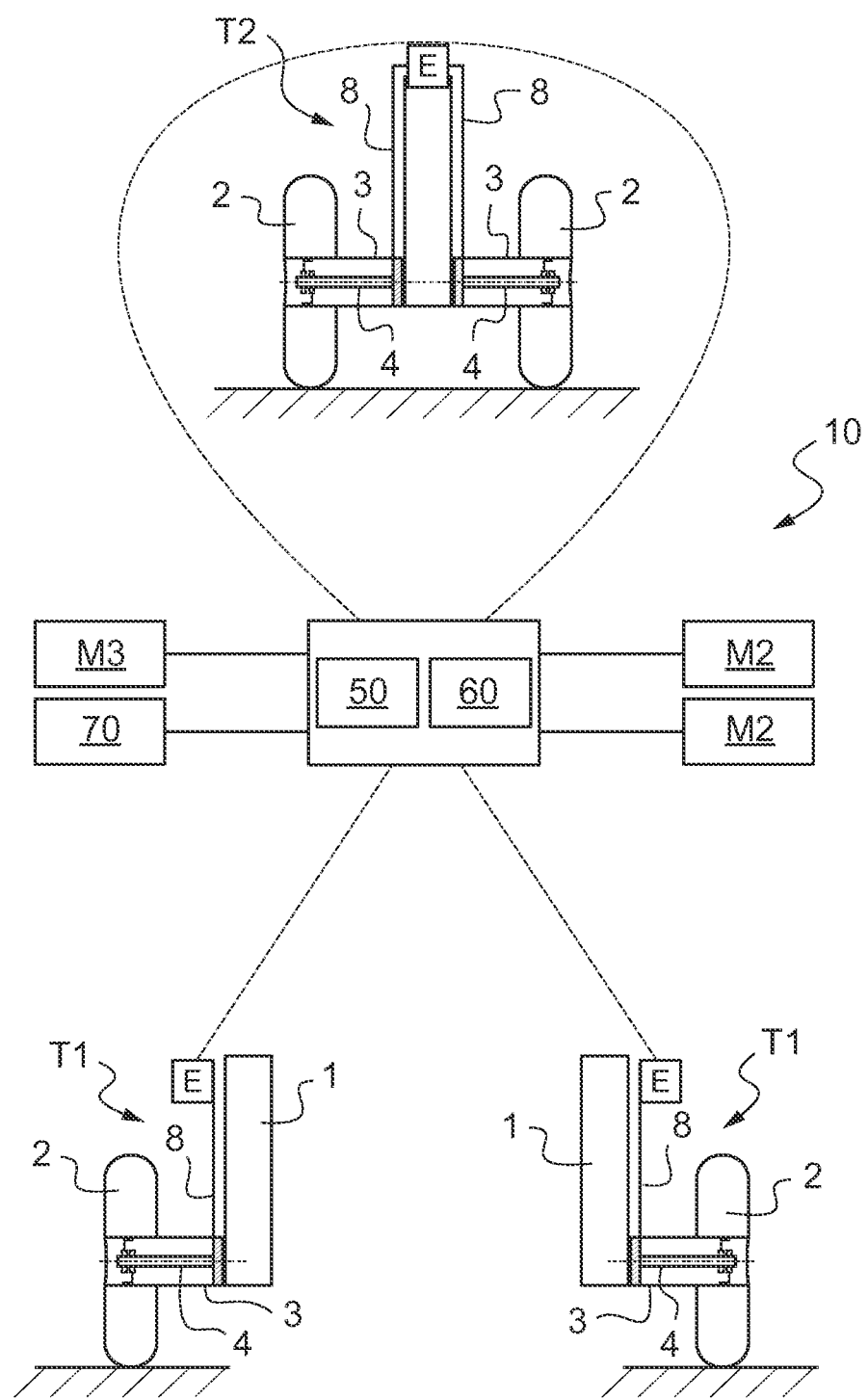

ON-BOARD DEVICE FOR MEASURING THE WEIGHT OF AN AIRCRAFT AND THE POSITION OF ITS CENTER OF GRAVITY

CROSS REFERENCE TO RELATED APPLICATIONS

This application claims priority to French patent application No. FR 12 00265 filed on Jan. 30, 2012, the disclosure of which is incorporated in its entirety by reference herein.

BACKGROUND OF THE INVENTION (1) Field of the Invention

The present invention relates to an on-board device for measuring the weight and even the position of the center of gravity of an aircraft, e.g. a rotorcraft.

(2) Description of Related Art

These two items of information are critical factors for safe and effective operation of any aircraft. Before each flight, the pilot of a vehicle of that type must therefore make sure that the weight and the balance of the aircraft relative to its center of gravity do not exceed limits that are predefined by the manufacturer.

A first device is known that is not mounted on board an aircraft and that seeks to weigh the aircraft when empty, i.e. without any load (passengers, fuel, . . . ), by arranging the aircraft under very precise conditions on a plurality of jacks. Those jacks are arranged on specific supports to avoid introducing interfering forces. The empty weight is then added to the load weight so as to estimate the total weight of the aircraft prior to takeoff and so as to estimate the position of its center of gravity.

Since measuring the empty weight is very difficult to perform, it cannot be done prior to each flight, given the means and the time required.

Devices on board an aircraft are sometimes used to obtain an accurate measurement of the weight and the position of the center of gravity before each flight. In addition, such devices improve flight safety, in particular since the pilot can verify unreliable information coming from external sources that relates to the loading weight and to the position of the center of gravity.

Those on-board devices rely on determining the deformations of a portion of each undercarriage and on easily deducing the total weight and the position of the center of gravity of the aircraft therefrom.

Document U.S. Pat. No. 3,426,586 describes a device provided with a deformable tube having strain gauges, with one such tube being inserted inside the axle of each undercarriage. The deformation of each tube as measured by the strain gauges makes it possible to deduce the total weight of the aircraft and the position of its center of gravity.

That device is advantageous. Nevertheless the field of aviation gives rise to requirements that are strict, in particular in terms of reliability. Unfortunately, strain gauges are sensitive to temperature, and thus they require the use of specific means for refining the measurements and for recalibrating them.

Document U.S. Pat. No. 4,312,042 suggests measuring the bending angle of an element of each undercarriage to obtain a direct indication concerning the weight of an aircraft. That document teaches using two inclinometers in order to determine the bending of the element in question.

Nevertheless, experience shows that it can be difficult to arrange two inclinometers on each undercarriage.

Document U.S. Pat. No. 3,488,997 describes a device for measuring the weight and the position of the center of gravity of an aircraft having an undercarriage that possesses at least one ground-contacting member that has a deformable element.

In addition, a bar is arranged inside the deformable element. Two sensors arranged on the deformable element via arms measure the movement of the bar respectively at two ends of the bar via arms.

When a force is exerted on each ground-contacting member, a free first portion of the deformable element carrying a first sensor deforms, while a second portion of the deformable element carrying a second sensor remains relatively stationary. Those two sensors are thus arranged on the deformable element to measure the movement of the deformable element via arms.

Document U.S. Pat. No. 3,488,997 neither discloses nor suggests two sensors arranged at the same end, nor does it suggest processor means for generating an alert.

Document FR 2 564 582 implements a rod arranged in an axle and two inductive sensors arranged on either side of the rod in order to perform differential detection of variations in relative position between the rod and the axle.

Document EP 0 482 289 implements an inductive sensor having two coils and a strip of ferromagnetic material that is movable in the coils.

Document FR 2 875 598 describes an on-board device for measuring the weight and the position of the center of gravity of an aircraft that has a plurality of undercarriages. Each undercarriage is provided with at least one ground-contacting member having an element that is deformable under the action of the weight of the aircraft when the aircraft is standing on a surface. The deformable element is provided with a bar having an eddy current sensor at its free end, the bar being arranged inside the deformable element.

Document WO 2004/074787 describes a device having a first portion and a second portion with an elongate member being attached to the first and second portions.

In addition, the elongate member has a magnetized region. At least one magnetic field probe element is used for detecting a distortion of the magnetic field emanating from the elongate member when a load is exerted on one or the other of the portions.

In one embodiment, at least one pair of probes is used, the signal representing the bending moment of the elongate member corresponding to the difference between the signals from the two probes of a pair.

Document U.S. Pat. No. 5,172,781 is remote from the technical field of undercarriages. That document presents a bed having a weight-measuring device. The device has a plurality of sensors known under the acronym "LVDT" for "linear variable differential transformer". Such a sensor is referred to below as an "LVDT sensor" for convenience.

The signals delivered by the various LVDT sensors are then processed in order to generate a single signal representing the average of the movements measured by the LVDT sensors.

Conventionally, an LVDT sensor comprises a ferromagnetic core and a set of coils surrounding the core. The set of coils has a primary coil and two secondary coils, with the core being suitable for co-operating with a feeler.

Under such circumstances, the movement of the feeler causes the core to move and consequently modifies the coupling coefficients between the primary coil and the secondary coils.

Such an LVDT sensor presents the advantage of being relatively insensitive to electromagnetic disturbances.

In addition, it is possible to detect an electrical failure of an LVDT sensor. Nevertheless, a mechanical failure, such as a break between a feeler and an LVDT sensor core is difficult to detect.

Document U.S. Pat. No. 4,503,922 describes a device having a deformable strip arranged between two plates, each plate having a winding.

BRIEF SUMMARY OF THE INVENTION

An object of the present invention is to provide an on-board device for measuring the weight of an aircraft and the position of its center of gravity, which device is capable of providing a user with information that is reliable and verified.

According to the invention, on-board device is used in particular for measuring the weight of an aircraft having a plurality of undercarriages, each undercarriage being provided with a hollow element extending from a first end to a second end. The first end may be secured to a connection member connecting it to a structure of the aircraft. Under such circumstances, the second end carries at least one ground-contacting member, which second portion is also deformable under the action of the weight of the aircraft when the aircraft is standing on a surface.

The on-board device then includes the hollow element and a bar. The bar extends inside the hollow element from an embedded end, e.g. fastened to the first end and/or to the connection member, towards a free end. A top internal zone of the hollow element is then above the free end, this free end being above a bottom internal zone of the hollow element opposite from the top internal zone.

Consequently, when the aircraft is standing on ground, the second portion of the hollow element deforms, unlike the bar which remains in an initial shape. As a result, the bottom internal zone of the hollow element tends to move towards the free end of the bar, while the top internal zone of the hollow element tends to move away from the free end.

The on-board device also includes first and second sensors that are arranged on said free end in order respectively to take a first measurement relating to a top distance between the free end and the top internal zone, and a second measurement relating to a bottom distance between the free end and the bottom internal zone.

The device is also provided with a processor unit connected to at least one of said sensors to deduce weight information therefrom.

The processor unit may use the information coming from a single sensor in conventional manner, or it may make use of an average of the information coming from the first and second sensors in order to deduce weight information therefrom.

Each measurement taken is representative of the deformation to which the deformable hollow element is subjected under the action of the weight of the aircraft, with the sensors being mounted inside that hollow element.

Each sensor thus delivers to the processor unit a main signal that is proportional to the deformation of the hollow element as measured in terms of a distance. The processor unit, preferably a computer of the aircraft, makes use of these main signals for calculating the weight or indeed the position of the center of gravity of the aircraft using known methods.

In addition, in order to optimize the calculation of the position of the center of gravity, and in particular in order to obtain good accuracy, two additional measurement means, e.g. inclinometers, are arranged inside the fuselage of the aircraft. Each of these measurement means transmits a respective secondary signal to the processor unit, the secondary signal relating to the pitch and roll angles of the aircraft. With the help of this additional data, the processor unit can determine very accurately the position in three-dimensional space of the center of gravity of the aircraft, relative to the frame of reference of the aircraft.

Furthermore, in novel and surprising manner, the device includes processor means connected to the first sensor and to the second sensor in order to generate an alert when a sum of the first measurement plus the second measurement varies.

One sensor measures a lengthening of a distance between the bar and one of said zones while the other sensor measures a shortening of a distance between the bar and the other of said zones. Since the first and second sensors co-operate with opposite zones of the same portion of the hollow element, the sum of the first and second measurements must remain constant.

Under such circumstances, if the processor means detect any variation in this sum, the processor means deduce therefrom that at least one of the sensors is faulty. The processor means then generate an alert.

The device is thus reliable, insofar as the device is designed to detect a malfunction of at least one sensor that could give rise to an erroneous measurement.

The device may also include one or more of the following additional characteristics.

For example, the processor means and the processor unit optionally comprise the same item. A computer provided with calculation means executing stored instructions then represents both the processor means and the processor unit.

The computer may be remote and communicate with each sensor via connections that are wired or wireless.

The processor means and the processor unit may alternatively be represented by two distinct physical entities.

In another aspect, the device may include alert means co-operating with the processor means to generate an alert when the sum varies.

The alert means may be means providing a visible and/or audible alert suitable for signaling a malfunction, if any, to a person.

Furthermore, the ground-contacting member may be a wheel and the hollow element may optionally be an axle of the wheel. The bar is then embedded in the root of the axle as represented by the first portion of the hollow element.

The device is thus easily incorporated in an existing environment.

Furthermore, the bar and the hollow element are advantageously coaxial.

By way of example, the bar and the hollow element are circular-base cylinders with the bar presenting an outside diameter that is less than an inside diameter of the hollow element.

The top internal zone and the bottom internal zone are thus diametrically opposite.

In a preferred embodiment, the first sensor is a movement sensor for measuring movement of the top internal zone relative to the bar, the second sensor being a movement sensor for measuring the movement of said bottom internal zone relative to said bar.

Each sensor may be an LVDT sensor having a set of coils and a ferromagnetic core co-operating with a feeler in contact with the associated zone.

The deformation of the second portion of the hollow element causes the feeler to move and consequently causes the core of each sensor to move.

The signal delivered by the sensor to the processor means or to the processor unit is thus modified.

In addition to a device, the invention provides an aircraft, provided with such a device.

The invention also provides the method implemented by the device.

The method thus consists in measuring the weight of an aircraft having a plurality of undercarriages, each undercarriage being provided with a hollow element extending from a first end to a second end and carrying at least one ground-contacting member, which element is deformable under the action of the weight of the aircraft when it is standing on a surface, and a bar extending inside the hollow element from an embedded end to a free end, a top internal zone of the hollow element being above the free end, and the free end being above a bottom internal zone of the hollow element opposite the top internal zone.

The method is remarkable in particular in that, the following steps are performed:

taking a first measurement relating to a top distance between the free end of the top internal zone, and a second measurement relating to a bottom distance between the free end and the bottom internal zone;

generating an alert when the sum of the first measurement plus the second measurement varies; and determining weight information from the measurement performed by at least one of said sensors, in order to estimate a weight or a position of a center of gravity.

BRIEF DESCRIPTION OF THE SEVERAL VIEWS OF THE DRAWINGS

The invention and its advantages appear in greater detail in the context of the following description of embodiments given by way of illustration and with reference to the accompanying figures, in which:

FIG. 3 is an operating diagram.

Elements that are present in more than one of the figures are given the same references in each of them.

DETAILED DESCRIPTION OF THE INVENTION

Figure 1:
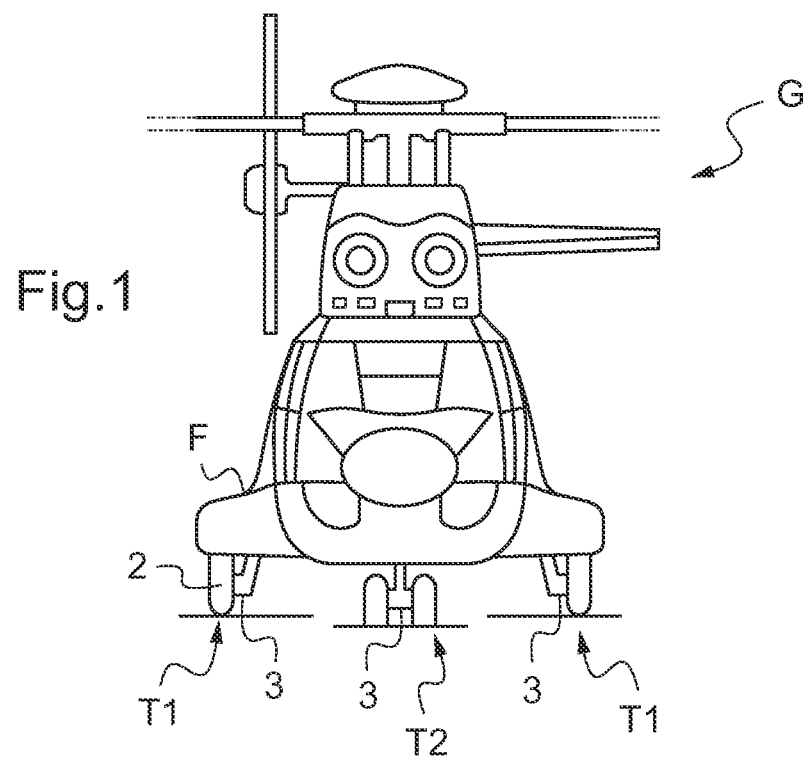
FIG. 1 is a face view of a rotorcraft provided with three undercarriages.

FIG. 1 is a view of an aircraft, specifically a rotorcraft G having a fuselage F. On the ground, the rotorcraft G stands on two undercarriages T1 that are each provided with one ground-contacting member, and on one undercarriage T2 that is provided with two ground-contacting members.

Under the action of the weight of the rotorcraft G, the undercarriages T1 and T2 deform. By measuring these deformations, it is possible, by calculation, to deduce the weight of the rotorcraft G and also the position of its center of gravity.

Figure 2:
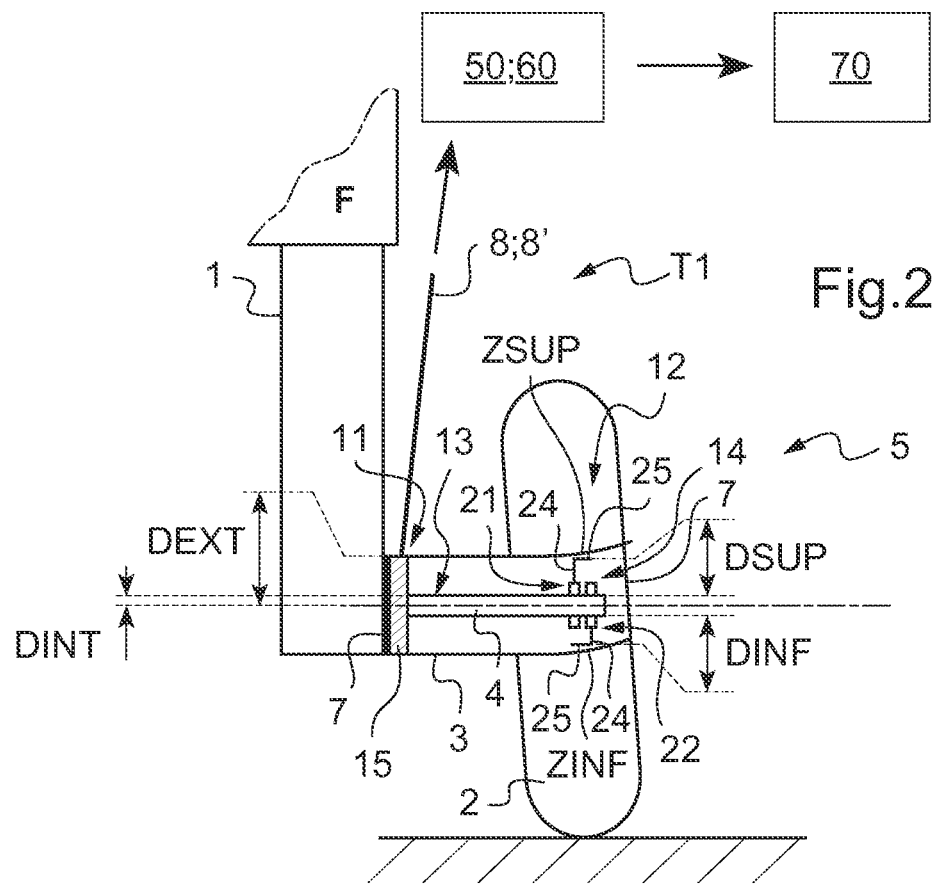
FIG. 2 shows the arrangement in a first embodiment of a bar inside a deformable element.

With reference to FIG. 2, the invention relates to a device 5 for measuring the weight of the aircraft G.

For each undercarriage, the device comprises a hollow element 3 that extends from a first end 11 towards a second end 12 that co-operates with at least one ground-contacting member 2.

The undercarriage T1 that is shown is of the "wheel type", so each ground-contacting member is thus a wheel. Under such circumstances, the first end 11 and the second 12 of the hollow element are fastened respectively to a connection member 1 and to a wheel 2. For example, the connection member 1 may be a shock absorber or a retracting actuator connected to the fuselage F.

In this configuration, the hollow element selected is preferably the wheel axle, i.e. the shaft on which the wheel is arranged.

Nevertheless, it is naturally possible to envisage using the invention with other types of undercarriage, e.g. an undercarriage having ground-contacting members of the "skid" or "ski" type, by appropriately selecting which deformable elements should be fitted with LVDT sensors.

Under the action of the weight of the aircraft on the ground, the second end 12 of the hollow element becomes deformed.

Consequently, the device 5 has a first sensor 21 and a second sensor 22 that are arranged inside the hollow element 3 in order to determine reliably the bending of the second portion 12 of the hollow element 3. This operation is performed on each undercarriage T1, T2.

In order to carry the first and second sensors 21 and 22, the device 5 has a bar 4.

The bar 4 extends inside the hollow element 3 from an embedded end 13 to a free end 14.

The embedded end is then fastened to the first end 11 of the hollow element by conventional fastener means 15.

In contrast, the free end 14 of the bar 4 is not secured to the hollow element 3, but remains inside the hollow element in the vicinity of its second end 12. Consequently, when the aircraft is standing on the ground, a top internal zone ZSUP of the hollow element 3 is above the free end 14, and the free end 14 is above a bottom internal zone ZINF of the hollow element 3.

In addition, when no force is exerted on the hollow element 3, the hollow element 3 and the bar 4 are accurately coaxial, both extending along the same axis of symmetry AX.

For example, the bar 4 and the hollow element 3 are circular-base cylinders, with the bar 4 having an outside DEXT that is smaller than the inside diameter DINT of the hollow element 3.

The top internal zone ZSUP and the bottom internal zone ZINF are thus diametrically opposite.

The bar 4 is thus not moved regardless of the weight of the aircraft, and consequently regardless of the resultant force acting on the hollow element.

The on-board device 5 thus also includes a first sensor 21 and a second sensor 22 arranged at the free end 14 of the bar 4.

It should be observed that it is possible to close the first end 11 and the second end 12 with sealing means 7 so as to avoid deposits intruding, which deposits might falsify the measurements of the first and second sensors 21 and 22.

The first and second sensors 21 and 22 take respectively a first measurement relating to a top distance DSUP between the free end 14 and the top internal zone ZSUP, and a second measurement relating to a bottom distance DINF between the free end 14 and the bottom internal zone ZINF.

Each sensor is connected by a wired and/or wireless connection 8 to processor means 50 so as to transmit thereto information relating to said distances DSUP and DINF.

Each sensor may be an LVDT sensor having a set of coils and a ferromagnetic core co-operating with a feeler 24 in contact with the associated zone.

Each feeler 24 may include a blade 25 in contact with the associated internal zone of the hollow element 3.

Reference may be made to the literature about how to implement an LVDT sensor so that calculation means can determine a distance.

The processor means then sum all of the information coming from the first and second sensors 21 and 22 of a bar 4 in order to verify that the first and second sensors 21 and 22 are operating properly.

Under such circumstances, if the sum varies and does not remain constant, then the processor means generate an alert. For this purpose, the processor means may instruct alert means 70 to generate an audible and/or visible alert.

The deflection of the hollow element 3 under the effect of the weight of the aircraft leads to a reduction in the distance between the free end 14 and one of the internal zones of the second portion 12, and conversely to an increase in the distance between the free end 14 and the other internal zone of the second portion 12.

Nevertheless, the sum of those distances remains constant. Any variation in the sum of the bottom distance DINF plus the top distance DSUP as measured therefore represents an anomaly resulting from a malfunction of at least one sensor. Consequently, the processor means generate an alert to signal the malfunction.

At least one sensor of each bar 4 is also connected via a wired and/or wireless connection 8' to a processor unit 60 for determining the weight of the aircraft, or indeed for determining the position of the center of gravity of the aircraft.

Conventionally, the deformations measured on each undercarriage with the help of information from one sensor or of an average of information from two sensors of a bar 4 enable the weight of the aircraft to be established.

It should be observed that the processor unit 60 and the processor means 50 may be constituted by the same means.

FIG. 3 is a diagram for explaining the operation of the invention.

Two undercarriages T1 each carry one wheel 2, while the third undercarriage T2 has two wheels 2.

Each wheel 2 has a deformable element 3 passing therethrough and referred to as an "axle", which element has inserted therein a bar 4 that carries a pair of sensors 21 and 22, possibly arranged side by side.

Each pair communicates with processor means 50 via a wired and/or wireless connection.

In a first variant, a cable connects each sensor directly to the processor means.

Nevertheless, in a second variant, each sensor is connected to a wireless transceiver E, e.g. of the microwave type, that is arranged on the undercarriage.

A transceiver powers a sensor electrically and transmits information coming from the sensor to the processor means. Such an arrangement makes it possible firstly to limit cabling and secondly to overcome possible difficulties of installation. If the undercarriage is free to perform rotary movements, it becomes necessary to use complex electrical connection systems that complicate the device considerably and that could constitute an obstacle to installing the device on existing aircraft.

If the sum of the information coming from two sensors 21 and 22 in a pair is no longer constant, then the processor means instruct alert means 70 to generate an alert.

Furthermore, at least one sensor in each pair communicates with a processor unit 60 in order to transmit thereto a main signal relating to a distance between a bar 4 and the associated hollow element 3.

By analyzing all of the main signals that reach it, the processor unit 60 determines the forces being subjected to the hollow elements 3. The processor unit then makes use of neural or geometrical calculation to deduce therefrom the total weight of the aircraft and the position of its center of gravity.

Nevertheless, in order to calculate the position of the center of gravity of the aircraft in very precise manner relative to the frame of reference of the aircraft and thus independently of its attitude relative to the ground, it may be advantageous to take its attitude into account in order to refine the calculations.

Under such circumstances, two complementary measurement means M2 transmit two secondary signals to the processor unit 60, which signals relate respectively to the pitch and roll angles of the aircraft relative to the ground.

These complementary measurement means M2 may be two inclinometers that measure the pitch and roll angles respectively and that are dedicated specifically to this application, or they may be any other means already present in the aircraft and performing the same function.

Finally, the device may include display means M3 for informing an operator, e.g. the pilot, of the total weight of the aircraft and also of the position of its center of gravity.

The display means M3 and the alert means may be constituted by a single piece of equipment.

Naturally, the present invention may be subjected to numerous variations as to its implementation. Although several implementations are described above, it will readily be understood that it is not conceivable to identify exhaustively all possible implementations. It is naturally possible to envisage replacing any of the means described by equivalent means without going beyond the ambit of the present invention.

What is claimed is:

1. An on-board device for measuring the weight of an aircraft (G) having a plurality of undercarriages (T1, T2), each undercarriage (T1, T2) being provided with a hollow element extending from a first end to a second end and carrying at least one ground-contacting member, which element is deformable under the action of the weight of the aircraft standing on a surface, said device comprising said hollow element and a bar extending inside said hollow element from an embedded end to a free end, a top internal zone (ZSUP) of said hollow element being above said free end, and said free end being above a bottom internal zone (ZINF) of said hollow element opposite the top internal zone (ZSUP), wherein said free end has a first sensor and a second sensor respectively for taking a first measurement relating to a top distance (DSUP) between said free end of said top internal zone (ZSUP), and a second measurement relating to a bottom distance (DINF) between said free end and said bottom internal zone (ZINF), said device including firstly processor means connected to the first and second sensors for generating an alert when a sum of the first measurement plus the second measurement varies, and secondly a processor unit connected to at least one of said sensors in order to determine information relating to weight.

2. A device according to claim 1, wherein the first sensor is a movement sensor for measuring movement of said top internal zone (ZSUP) relative to said bar, the second sensor being a movement sensor for measuring the movement of said bottom internal zone (ZINF) relative to said bar.

3. A device according to claim 1, wherein each sensor is an LVDT sensor having a set of coils and a ferromagnetic core co-operating with a feeler in contact with the associated zone.

4. A device according to claim 1, wherein said processor means and said processor unit comprise the same item.

5. A device according to claim 1, wherein said ground-contacting member is a wheel and said hollow element is an axle of the wheel.

6. A device according to claim 1, wherein said bar and said hollow element are coaxial.

7. A device according to claim 6, wherein said bar and said hollow element are circular-base cylinders with said bar presenting an outside diameter (DEXT) that is less than inside diameter (DINT) of said hollow element.

8. A device according to claim 1, wherein the device includes alert means co-operating with said processor means to generate an alert when said sum varies.

9. An aircraft (G), including a device according to claim 1.

10. A method of measuring the weight of an aircraft having a plurality of undercarriages (T1, T2), each undercarriage (T1, T2) being provided with a hollow element extending from a first end to a second end and carrying at least one ground-contacting member, which element is deformable under the action of the weight of the aircraft standing on a surface, and a bar extending inside said hollow element from an embedded end to a free end, a top internal zone (ZSUP) of said hollow element being above said free end, and said free end being above a bottom internal zone (ZINF) of said hollow element opposite the top internal zone (ZSUP), the method being characterized by the following steps:

taking a first measurement relating to a top distance (DSUP) between said free end of said top internal zone (ZSUP) with the help of a first sensor, and a second measurement relating to a bottom distance (DINF) between said free end and said bottom internal zone (ZINF) with the help of a second sensor;

generating an alert when the sum of the first measurement plus the second measurement varies; and determining weight information from the measurement performed by at least one of said sensors.

\* \* \* \* \*